(12) United States Patent
Sellars et al.

(10) Patent No.: US 8,191,671 B2
(45) Date of Patent: Jun. 5, 2012

(54) AXLE CARRIER ASSEMBLIES AND VEHICLES COMPRISING AXLE CARRIER ASSEMBLIES

(75) Inventors: Daniel Thomas Sellars, West Liberty, OH (US); Scott Daniel Batdorf, Raymond, OH (US)

(73) Assignee: Honda Motor Company, Ltd., Tokyo (JP)

(*) Notice: Subject to any disclaimer, the term of this patent is extended or adjusted under 35 U.S.C. 154(b) by 33 days.

(21) Appl. No.: 12/824,752

(22) Filed: Jun. 28, 2010

(65) Prior Publication Data

US 2011/0315468 A1  Dec. 29, 2011

(51) Int. Cl.
*B60K 17/00* (2006.01)
(52) U.S. Cl. ...................................................... 180/348
(58) Field of Classification Search ............... 180/217, 180/348, 351, 357, 366, 373, 374, 378; 474/112, 474/113, 116, 117, 120, 133, 136, 903
See application file for complete search history.

(56) References Cited

U.S. PATENT DOCUMENTS

| 4,237,744 | A | * | 12/1980 | Jolly ............................ 474/116 |
| 4,541,502 | A | | 9/1985 | Iwai et al. |
| 4,596,299 | A | * | 6/1986 | Krude ........................... 180/348 |
| 4,714,453 | A | | 12/1987 | Takayanagi |
| 4,936,812 | A | | 6/1990 | Redmond |
| 5,553,881 | A | | 9/1996 | Klassen et al. |
| 6,286,846 | B1 | | 9/2001 | Aparicio et al. |
| 6,948,581 | B2 | | 9/2005 | Fecteau et al. |
| 7,837,000 | B2 | * | 11/2010 | Matsuura et al. ............. 180/351 |

OTHER PUBLICATIONS

2004 Suzuki GSX-R750, X 2004-2005 Rear Swinging Arm Parts diagram and list, http://www.mycycles.com/fiche_section_detail.asp, retrieved Jun. 28, 2010.

* cited by examiner

*Primary Examiner* — Paul N Dickson
*Assistant Examiner* — Robert A Coker
(74) *Attorney, Agent, or Firm* — Ulmer & Berne LLP (57) ABSTRACT

An axle carrier assembly is provided for a vehicle. The axle carrier assembly includes an axle carrier, a first cylinder, a second cylinder, and an actuator. The axle carrier is configured to rotatably support an axle. The first cylinder is rotatably supported by the axle carrier such that the first cylinder is rotatable about a first axis. The first cylinder is configured to support a vehicular swing member. The second cylinder is rotatably supported by the axle carrier such that the second cylinder is rotatable about a second axis. The second cylinder is configured to support a vehicular swing member. The actuator is associated with each of the first and second cylinders. The actuator is configured to substantially simultaneously rotate the first cylinder and the second cylinder with respect to the axle carrier.

17 Claims, 7 Drawing Sheets

AXLE CARRIER ASSEMBLIES AND VEHICLES COMPRISING AXLE CARRIER ASSEMBLIES

TECHNICAL FIELD

An axle carrier assembly is provided for a vehicle. The axle carrier assembly includes rotable first and second cylinders that facilitate movement of an axle carrier with respect to a swing member.

BACKGROUND

A conventional all terrain vehicle ("ATV") includes a drive axle that is supported by a swing member. The axle is supportive of a drive member (e.g., a sprocket). A flexible drive member, such as a chain, can be coupled with the drive member to facilitate rotation of the drive axle to power the ATV. Tension between the chain and the drive member can be maintained to ensure proper engagement with the drive member during operation of the ATV. When a user desires to change the tension on the chain (e.g., to install or remove the chain), the user can operate a chain adjustment assembly to move the axle closer to the vehicle's frame. However, when a user operates these conventional chain adjustment assemblies, the suspension geometry of the vehicle can be adversely affected.

SUMMARY

In accordance with one embodiment, an axle carrier assembly comprises an axle carrier, a first cylinder, a second cylinder, and an actuator. The axle carrier is configured to rotatably support an axle. The first cylinder is rotatably supported by the axle carrier such that the first cylinder is rotatable about a first axis. The first cylinder is configured to support a vehicular swing member at a location along the first cylinder that is offset from the first axis. The second cylinder is rotatably supported by the axle carrier such that the second cylinder is rotatable about a second axis. The second cylinder is configured to support a vehicular swing member at a location along the second cylinder that is offset from the second axis. The actuator is associated with each of the first and second cylinders. The actuator is configured to substantially simultaneously rotate the first cylinder and the second cylinder with respect to the axle carrier.

In accordance with another embodiment, an axle carrier assembly comprises an axle carrier, a first cylinder, a second cylinder, and an elongate threaded member. The axle carrier defines an axle support aperture. The first cylinder is rotatably supported by the axle carrier such that the first cylinder is rotatable about a first axis. The first cylinder comprises a first threaded outer surface and defines a first chamber. The first chamber has a first longitudinal centerline axis that is offset from the first axis. The second cylinder is rotatably supported by the axle carrier such that the second cylinder is rotatable about a second axis. The second cylinder comprises a second threaded outer surface and defines a second chamber. The second chamber has a second longitudinal centerline axis that is offset from the second axis. The elongate threaded member has a third threaded outer surface. The elongate threaded member contacts the first cylinder and the second cylinder such that the third threaded outer surface engages each of the first threaded outer surface and the second outer threaded surface. Actuation of the elongate threaded member substantially simultaneously rotates the first cylinder and the second cylinder with respect to the axle carrier.

In accordance with yet another embodiment, a vehicular drive assembly comprises a swing member, an axle carrier, an axle, a flexible drive member, a first cylinder, a second cylinder, an actuator, a first fastener, and a second fastener. The axle is rotatably supported by the axle carrier and comprises a drive member. The flexible drive member is engaged with the drive member and is configured to facilitate rotation of the axle. The first cylinder is rotatably supported by the axle carrier such that the first cylinder rotates about a first axis. The first cylinder defines a first chamber, the first chamber having a first longitudinal centerline axis that is offset from the first axis. The second cylinder is rotatably supported by the axle carrier such that the second cylinder rotates about a second axis. The second cylinder defines a second chamber, and the second chamber has a second longitudinal centerline axis that is offset from the second axis. The actuator is engaged with each of the first cylinder and the second cylinder. Actuation of the actuator substantially simultaneously rotates the first cylinder and the second cylinder with respect to the axle carrier. The first fastener extends into the first chamber. The first fastener couples the first cylinder to a portion of the swing member. The second fastener extends into the second chamber. The second fastener couples the second cylinder to a portion of the swing member.

BRIEF DESCRIPTION OF THE DRAWINGS

While the specification concludes with claims particularly pointing out and distinctly claiming the present invention, it is believed that the same will be better understood from the following description taken in conjunction with the accompanying drawings in which:

DETAILED DESCRIPTION

Figure 1:
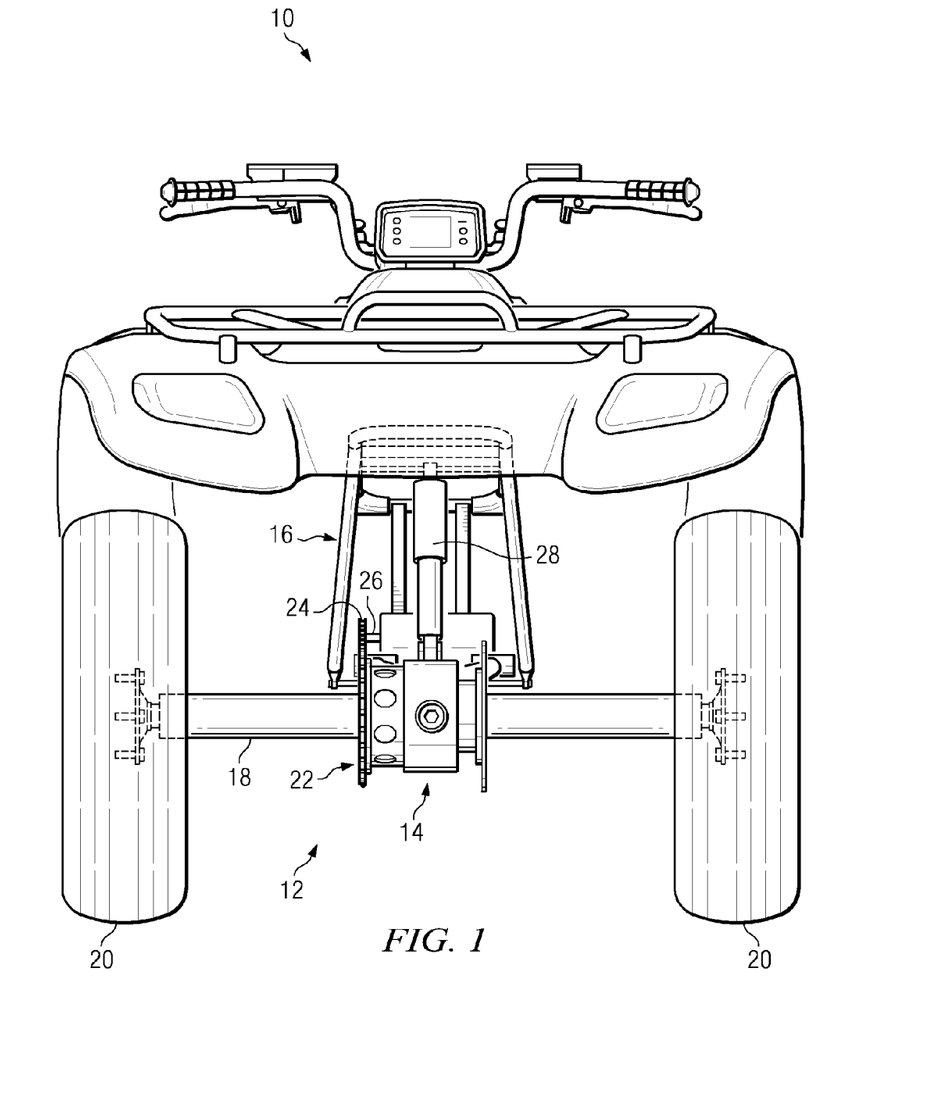
FIG. 1 is a rear elevational view depicting an all terrain vehicle incorporating an axle carrier assembly in accordance with one embodiment.
Figure 2:
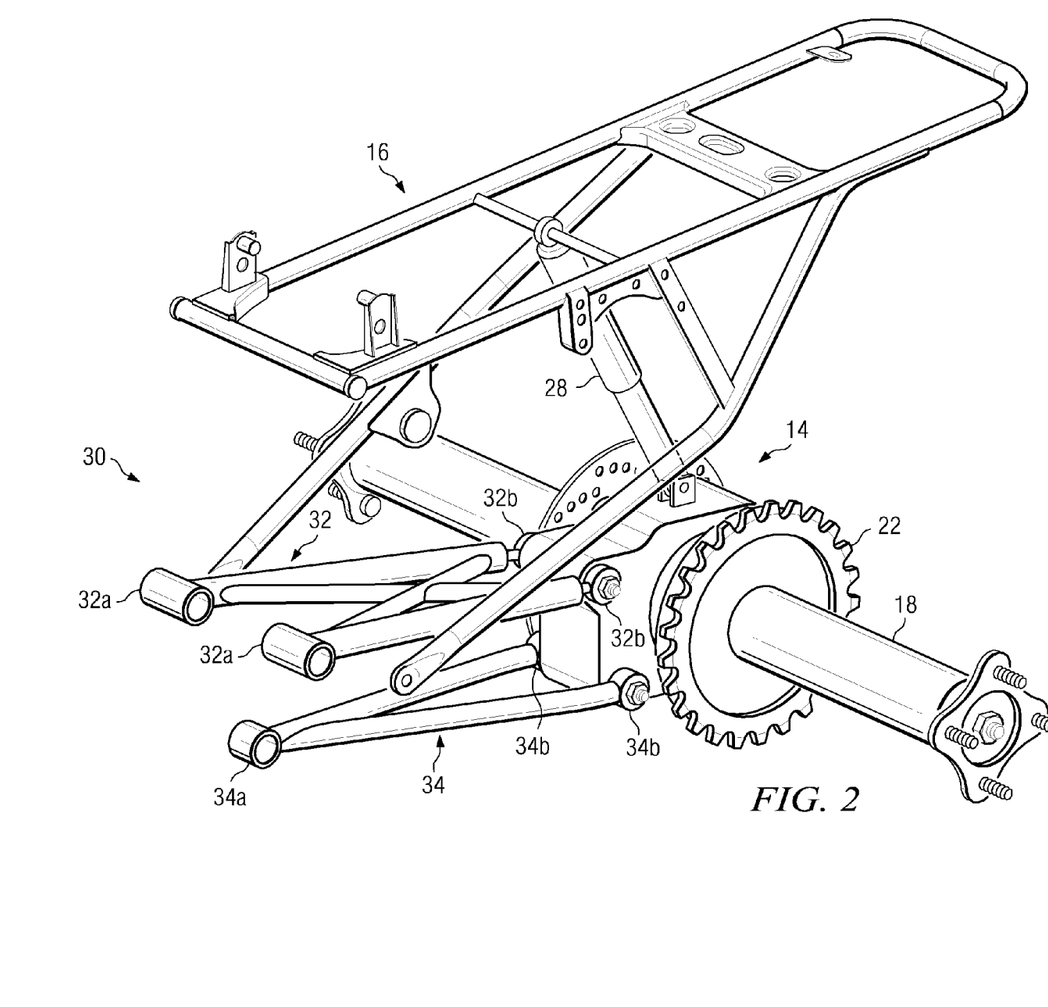
FIG. 2 is a perspective view depicting the axle carrier assembly and other selected components of the all terrain vehicle of FIG. 1.

In connection with the views and examples of FIGS. 1-7, wherein like numbers indicate the same or corresponding elements throughout the views, FIG. 1 illustrates a vehicular drive assembly 12, according to one embodiment, incorporated upon a vehicle 10. The drive assembly 12 can include an axle carrier assembly 14 supported with respect to a frame 16. The axle carrier assembly 14 can rotatably support an axle 18. In one embodiment, the axle 18 can be journaled within an aperture (e.g., 27 in FIG. 3) defined by the axle carrier assembly 14. A pair of rear wheels 20 can be supported at opposite ends of the axle 18. A drive member 22, which can be a sprocket as shown in FIG. 2, or alternatively a pulley, can be coupled with the axle 18 and can engage a flexible drive member 24 such as a belt or a chain. In one embodiment, the flexible drive member 24 can be driven by a drive shaft 26 powered by an engine (not shown) of the vehicle 10. The axle carrier assembly 14 can be provided on an ATV as shown in FIG. 1 or can alternatively be provided on any variety of other vehicles incorporating flexible drive members including utility vehicles (UTV), motorcycles, or bicycles, for example.

The axle carrier assembly 14 is shown to be supported with respect to the frame 16 by a cushion member 28 (e.g., a shock absorber, damper). Respective ends of the cushion member 28 can be pivotally attached to the axle carrier assembly 14 and the frame 16. When the axle carrier assembly 14 moves with respect to the frame 16 (e.g., during jounce or roll when the vehicle 10 encounters uneven terrain), the cushion member 28 can dampen such movement. It will be appreciated that a cushion member can be provided in any of a variety of suitable alternative arrangements. For example, when an axle is configured to articulate with respect to a frame (such as during vehicular roll), a pair of cushion members can be respectively supported at opposite ends of the axle to dampen articulation of the axle.

The axle carrier assembly 14 is shown to be further supported with respect to the frame 16 by a swing member 30. As illustrated in FIG. 2, the swing member 30 can include an upper swing member portion 32 and a lower swing member portion 34. The upper swing member portion 32 and lower swing member portion 34 can include respective first ends 32a, 34a. A portion of the first ends 32a, 34a are shown to be annular to facilitate respective pivotal attachment to a portion (not shown) of the frame 16. The upper swing member portion 32 and lower swing member portion 34 can also include respective second ends 32b, 34b that can each be pivotally attached to the axle carrier assembly 14, as will be described in more detail below. It will be appreciated, that a swing member can have any of a variety of suitable arrangements for supporting an axle carrier assembly with respect to a frame. For example, the upper and lower swing member portions 32, 34 can be coupled to each other such as with a cross brace (not shown).

Figure 3:
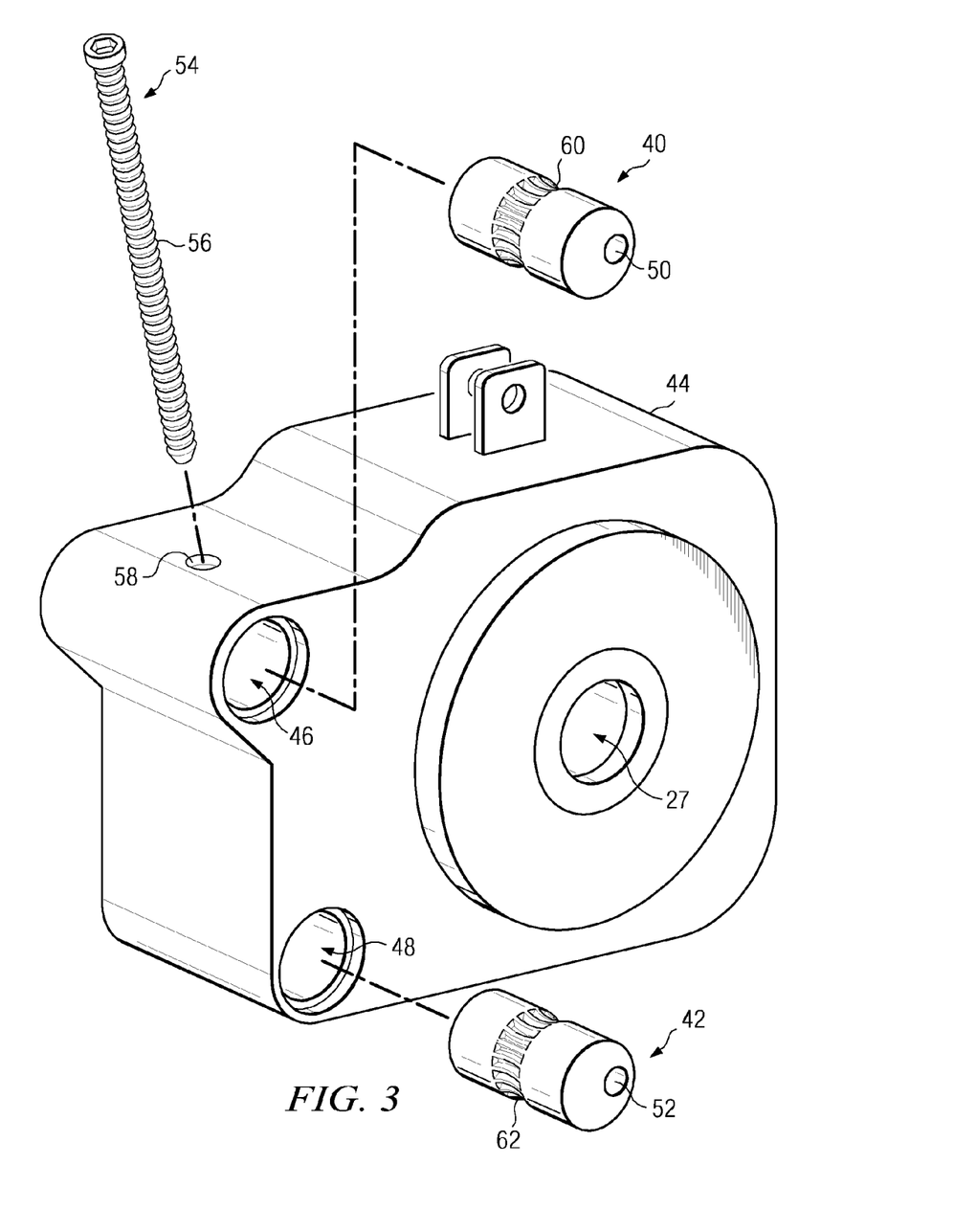
FIG. 3 is an exploded perspective view depicting selected components of the axle carrier assembly of FIG. 2.
Figure 4:
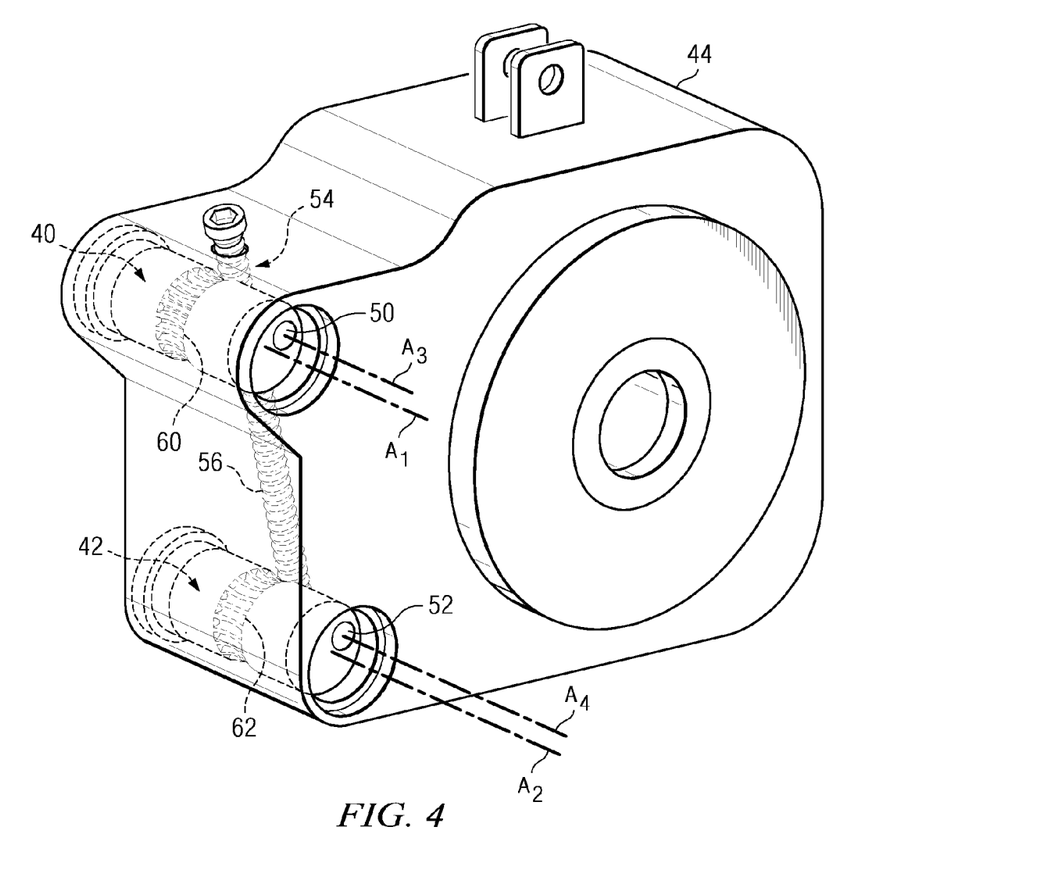
FIG. 4 is an exploded perspective view similar to FIG. 3, but with the components of the axle carrier assembly shown in an assembled configuration.

The axle carrier assembly 14 can include a first cylinder 40 and a second cylinder 42 each rotatably supported by an axle carrier 44. In one embodiment, as illustrated in FIG. 3, the axle carrier 44 can define a first passage 46 and a second passage 48. As shown in FIG. 4, the first cylinder 40 can be disposed within the first passage 46 and the second cylinder 42 can be disposed within the second passage 48 such that the first cylinder 40 and second cylinder 42 are rotatable about respective axes A1, A2. Although, the first cylinder 40 and the second cylinder 42 are shown to directly contact the axle carrier 44 when disposed in the respective first and second passages 46, 48, it will be appreciated that a first and second cylinder can be rotatably supported by an axle carrier in any of a variety of suitable alternative arrangements, such as, for example, with bearings.

As illustrated in FIG. 3, the first cylinder 40 and the second cylinder 42 can define a first chamber 50 and a second chamber 52, respectively. As illustrated in FIG. 4, the first chamber 50 can have a first longitudinal centerline axis A3 and the second chamber 52 can have a second longitudinal centerline axis A4. The first chamber 50 can be located within the first cylinder 40 such that the first longitudinal centerline axis A3 is offset from the axis A1. The second chamber 52 can be located within the second cylinder 42 such that the second longitudinal centerline axis A4 is offset from the axis A2.

The axle carrier assembly 14 can further include an actuator associated with each of the first cylinder 40 and the second cylinder 42. The actuator can facilitate simultaneous rotation of the first cylinder 40 and the second cylinder 42 with respect to the axle carrier 44. In one embodiment, as illustrated in FIG. 3, the actuator can be an elongate threaded member 54. The elongate threaded member 54 is shown to include a threaded outer surface 56. The elongate threaded member 54 can be rotatably supported within a third passage 58 defined by the axle carrier 44. When the first and second cylinders 40, 42 are respectively disposed within the first and second passages 46, 48, the threaded outer surface 56 of the elongate threaded member 50 can simultaneously engage threaded outer surfaces 60, 62 of the first cylinder 40 and the second cylinder 42, respectively, in a worm-gear arrangement. Accordingly, the elongate threaded member 54 can be rotated with respect to the axle carrier 44, such as with a wrench, to facilitate substantially simultaneous rotation of each of the first cylinder 40 and the second cylinder 42 with respect to the axle carrier 44. It will be appreciated that an elongate threaded member can interact with a first cylinder and second cylinder in any of a variety of threaded arrangements to facilitate simultaneous rotation of the first and second cylinders such as a helical arrangement, for example.

It will be appreciated that a first cylinder, a second cylinder, and an actuator can be provided in any of a variety of suitable arrangements. For example, in lieu of the elongate threaded member 54, individual servo motors can be coupled (e.g., directly or indirectly) with each of a first cylinder and a second cylinder and can be synchronously powered to substantially simultaneously rotate the first and second cylinders.

Figure 5:
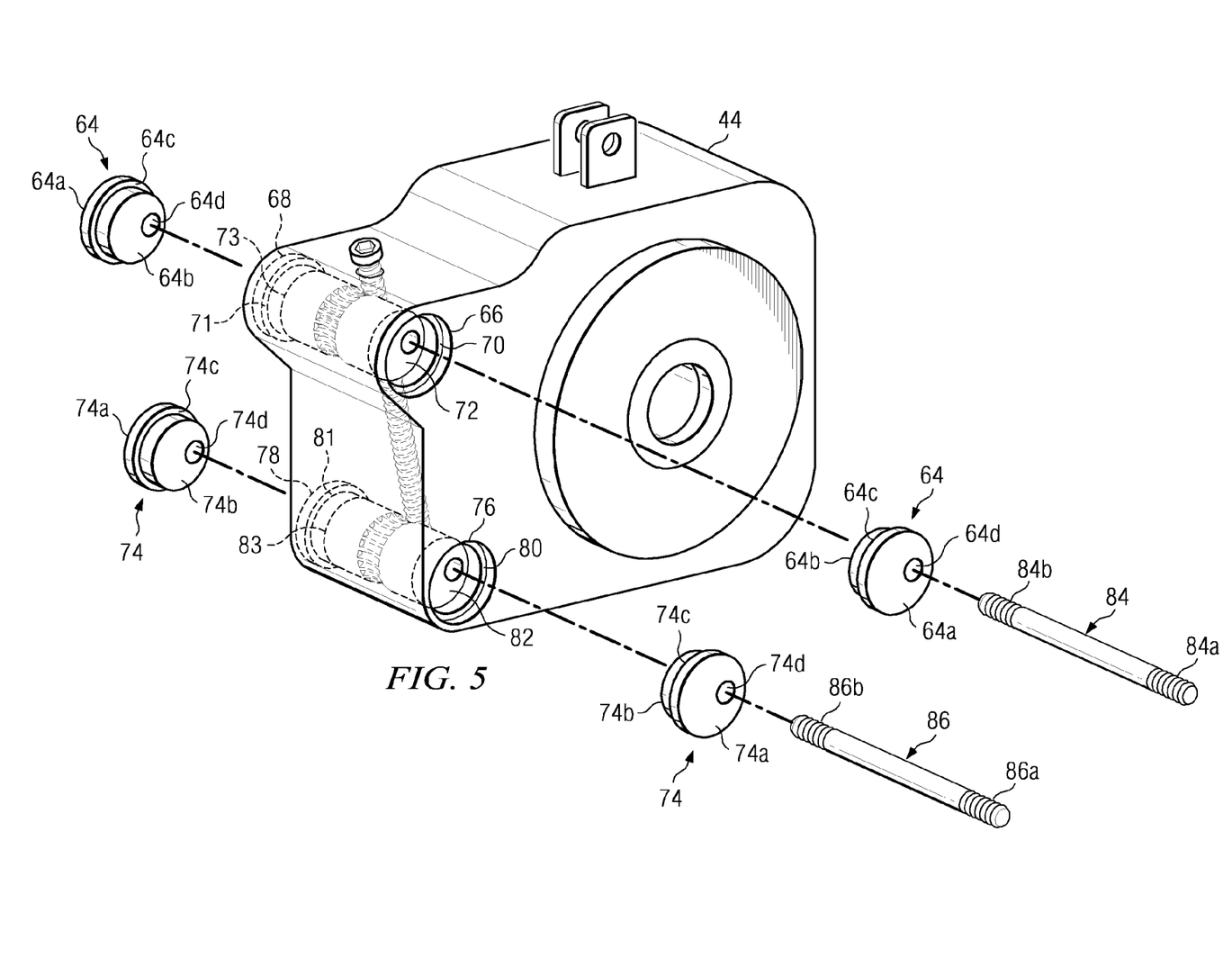
FIG. 5 is an exploded view depicting the assembled components of the axle carrier assembly shown in of FIG. 4 and further depicting additional selected components of the axle carrier.
Figure 6:
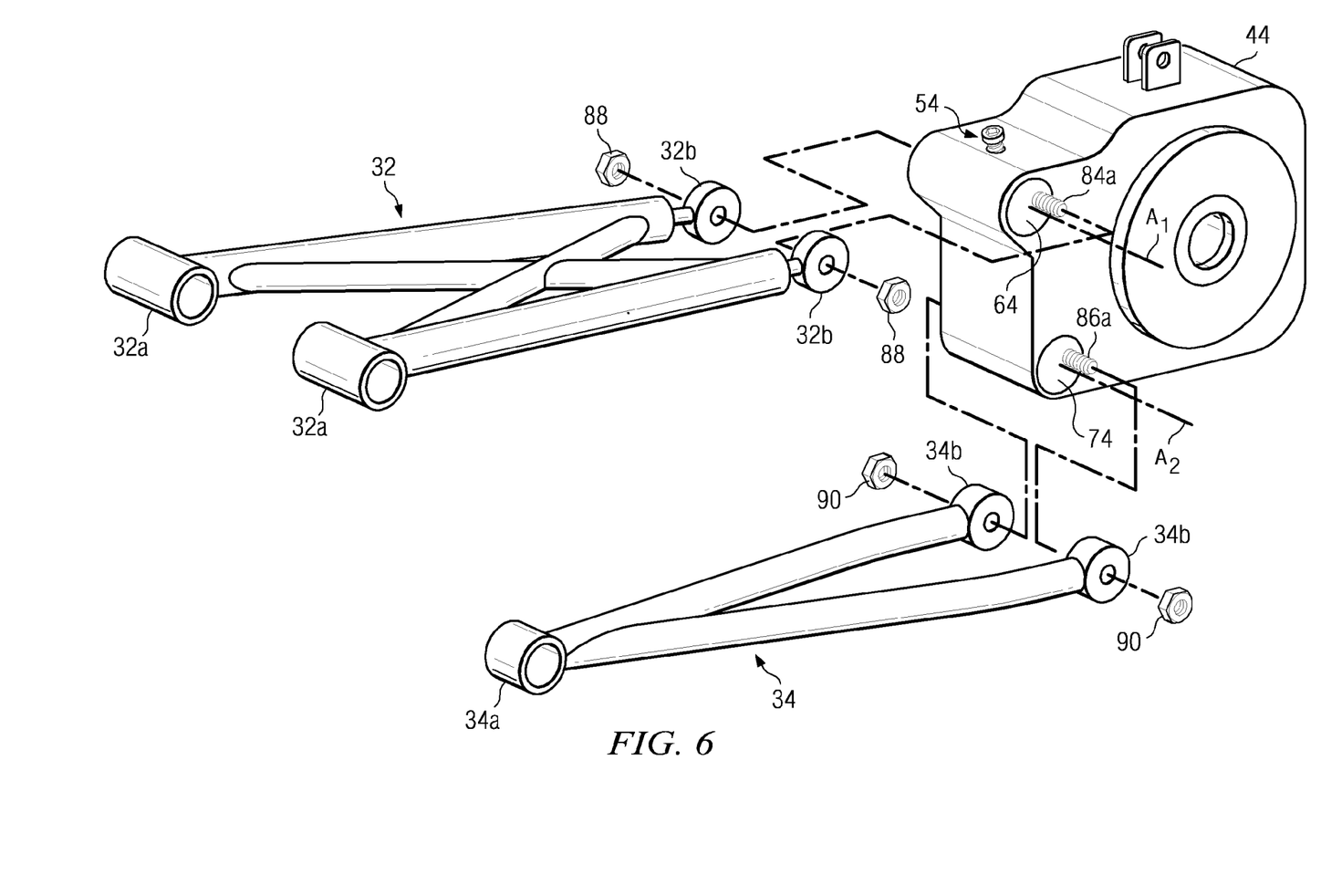
FIG. 6 is a perspective view similar to FIG. 5, but with the components of the axle carrier assembly shown in an assembled configuration and further depicting a swing member associated with the axle carrier assembly.

The axle carrier assembly 14 can include first and second locking assemblies associated with the respective first and second cylinders 40, 42. The first and second locking assemblies can be configured to selectively secure the first cylinder 40 and the second cylinder 42 with respect to the axle carrier 44. In one embodiment, as illustrated in FIG. 5, the locking assemblies can include a pair of first locking plates 64 associated with the first cylinder 40. The first locking plates 64 are each shown to include an outer surface 64a, an inner surface 64b, and a flange surface 64c. Opposite ends of the first passage 46 are shown to include a pair of relatively larger diameter portions 66, 68 which cooperate with the remaining, relatively smaller diameter portions of the first passage 46 to define respective shoulders 70, 71. One of the first locking plates 64 can be disposed within the larger diameter portion 66 and the other of the first locking plates 64 can be disposed within the larger diameter portion 68 (e.g., such that the first passage 46 is substantially covered as shown in FIG. 6). The first locking plates 64 are shown to each define an opening 64d which can communicate with the first passage 46. The first locking plates 64 can each be urged towards the first cylinder 40 (e.g., by applying simultaneous force to outer surfaces 64a) to lock the first cylinder 40 with respect to the axle carrier 44. In particular, the flange surfaces 64c of the first locking plates 64 can engage the respective shoulders 70, 71 and the inner surfaces 64b of the first locking plates 64 can engage respective ends 72, 73 of the first cylinder 40 thereby locking the first cylinder 40 with respect to the axle carrier 44.

The axle carrier assembly 14 can further include second locking plates 74 associated with the second cylinder 42 and arranged similar to the first locking plates 64. For example, the second locking plates 74 can include an outer surface 74a, an inner surface 74b, and a flange surface 74c. Opposite ends of the second passage 48 can include a pair of relatively larger diameter portions 76, 78 which cooperate with the remaining, relatively smaller diameter portions of the second passage 48 to define respective shoulders 80, 81. One of the second locking plates 74 can be disposed within the larger diameter portion 76 and the other of the second locking plates 74 can be disposed within the larger diameter portion 78. Openings 74*d* defined by the second locking plates 74 can communicate with the second passage 48. The second locking plates 74 can lock the second cylinder 42 with respect to the axle carrier 44 by urging each of the second locking plates 74 towards the second cylinder 42 such that the flange surfaces 74*c* engage the respective shoulders 80, 81 and the inner surfaces 74*b* engage respective ends 82, 83 of the second cylinder 42.

It will be appreciated that locking assemblies can be provided in any of a variety of suitable alternative arrangements. For example, only one pair of locking plates can be provided to facilitate locking of either the first cylinder or second cylinder. It will also be appreciated that the axle carrier assembly 14 can include any of a variety of suitable alternative locking assemblies. For example, a cotter pin can be selectively provided through each of a first and second cylinder to lock the first and second cylinder with respect to an axle carrier.

The axle carrier assembly 14 is shown to include a first pin 84 and a second pin 86 each including respective threaded ends 84*a*, 84*b*, 86*a*, 86*b*. The first pin 84 can extend into the openings 64*d* and the first chamber 50 and the second pin 86 can extend into the openings 76*d* and the second chamber 52. As illustrated in FIG. 6, the swing member 30 can be arranged with respect to the axle carrier 44 such that the first cylinder 40 is disposed between the second ends 32*b* of the upper swing member portion 32 and the second cylinder 42 is disposed between the second ends 34*b* of the lower swing member portion 34. In such an arrangement, the first pin 84 can pivotally support the second ends 32*b* of the upper swing member portion 32 and the second pin 86 can pivotally support the second ends 34*b* of the lower swing member portion 34. A nut 88 can be threaded onto each of the threaded ends 84*a*, 84*b* to couple the upper swing member portion 32 with the first cylinder 40. Similarly, a nut 90 can be threaded onto each of the threaded ends 86*a*, 86*b* to couple the lower swing member portion 34 with the second cylinder 42. It will be appreciated that the axle carrier assembly 14 can include other suitable alternative fasteners to facilitate respective releasable coupling of the first cylinder 40 and the second cylinder 42 to the swing member 30. For example, bolts can be threaded into the first and second chambers to couple a swing member to first and second cylinders.

It will be appreciated from FIGS. 4-6 that the first pin 84 and the second pin 86 are offset from (e.g., not centered along) the respective axes A1 and A2. As such, when the first and second cylinders 40, 42 are rotated with respect to the axle carrier 44, the position of the first and second pins 84, 86 changes relative to the axle carrier 44. When the upper and lower swing member portions 32, 34 are respectively coupled with the first and second cylinders 40, 42, rotation of the first and second cylinders 40, 42 can move the axle carrier 44 relative to the swing member 30. Therefore, when the axle carrier 44 is provided on the vehicle 10, movement of the axle carrier 44 can change the distance between a drive member (e.g., 22 shown in FIG. 2) and a drive shaft (e.g., 26 in FIG. 2) to thereby change the tension of a flexible drive member (e.g., 24 in FIG. 2) engaged with the drive member and the drive shaft.

Figure 7:
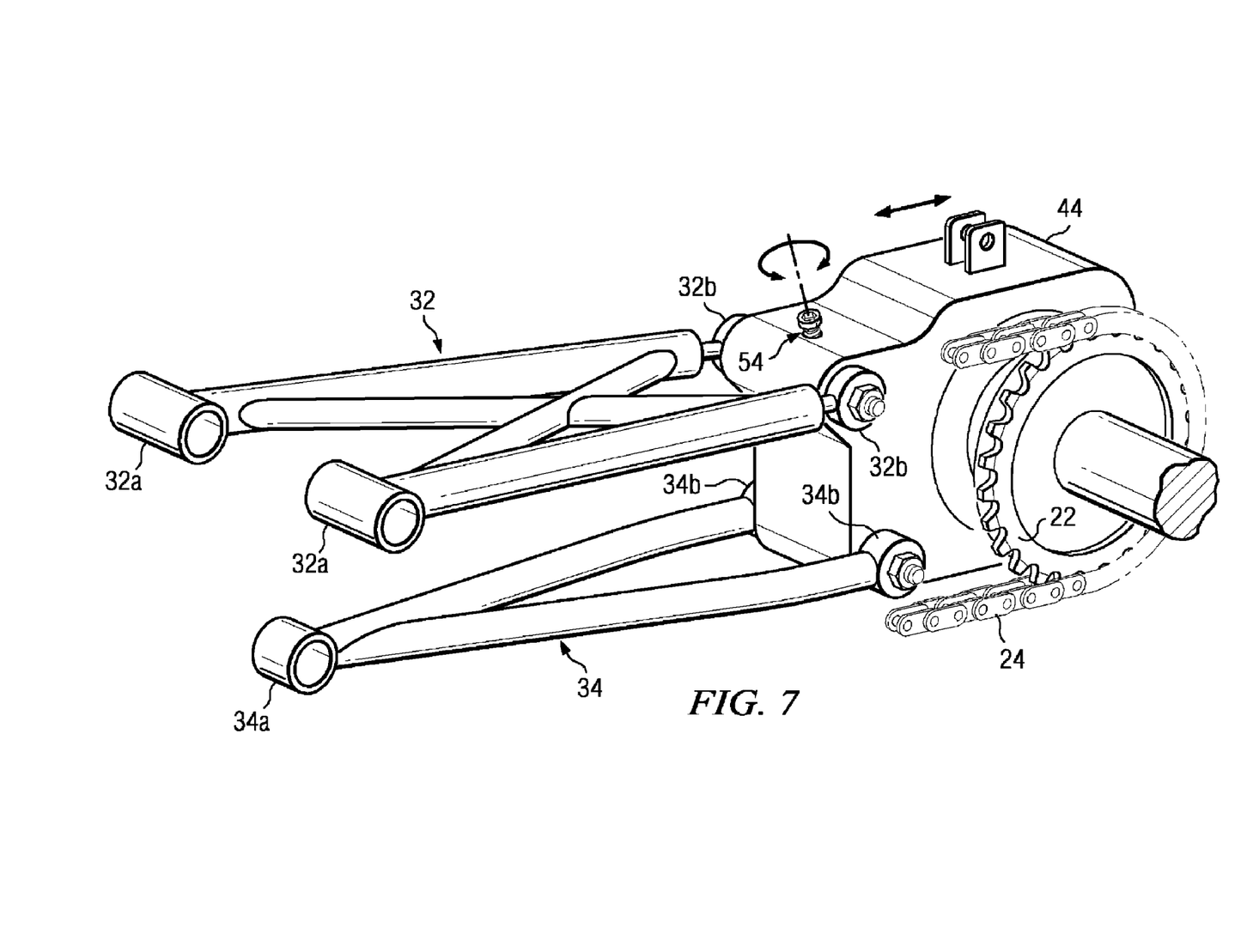
FIG. 7 is a perspective view of the swing member and the axle carrier assembly shown in FIG. 6, but with the swing member coupled with the axle carrier assembly.

In one embodiment, as illustrated in FIG. 7, the tension of the flexible drive member 24 can be changed by actuating the elongate threaded member 54. In particular, the elongate threaded member 54 can be rotated to simultaneously rotate the first and second cylinders 40, 42. Rotation of the first and second cylinders 40, 42 correspondingly rotates the first and second pins 84, 86 around respective axes A1, A2 (shown in FIG. 4). The upper and lower swing member portions 32, 34 can be pivotally coupled with the respective first and second pins 84, 86. Therefore, the upper and lower swing member portions 32, 34 can be pivoted around the respective axes A1, A2 in an eccentric pattern when the first and second cylinders 40, 42 are rotated. This eccentric pattern facilitates oscillating movement of the axle carrier 44 (e.g., towards forward and rearward ends of the vehicle 10) with respect to the swing member 30. The tension of the flexible drive member 24, therefore, can be adjusted (e.g., to remove the flexible drive member 24 from the vehicle 10) by actuating the elongate threaded member 54 and moving the axle carrier 44 with respect to the swing member 30.

Adjusting the tension of a flexible drive member on a conventional vehicle can oftentimes require a user to manually position the axle carrier on a vehicle which can in some instances require individual rotation of each of first and second cylinders. The manual positioning of these first and second cylinders can be time consuming and, in some instances, can even require some disassembly of the swing member 30 and/or axle carrier 44. In addition, when first and second cylinders are manually rotated to move as axle carrier on a conventional vehicle, the suspension geometry of the vehicle may be changed and the overall performance of the vehicle can be affected. It will therefore be appreciated that the axle carrier assembly 14 can facilitate adjustment of the tension of a flexible drive member on a vehicle more efficiently and without significant affect on the suspension geometry of the vehicle 10. For example, actuation of the elongate threaded member 54 only requires the use of minimal tools (e.g., a wrench) and substantially reduces a user's direct individual interaction with each of the first and second cylinders 40, 42 (i.e., to rotate the first and second cylinders). Moreover, since the first and second cylinders 40, 42 can be simultaneously rotated by the elongate threaded member 54, the position of each of the upper and lower swing member portions 32, 34 on the axle carrier 44 change in unison. Therefore, the suspension geometry can be easily maintained when the first and second cylinders 40, 42 are rotated.

It will be appreciated that the radial distance of the first and second pins 84, 86 from the respective axes A1, A2 can affect the distance that the axle carrier 44 moves with respect to the swing member. For example, a greater distance between the first and second pins 84, 86 and the respective axes A1, A2 can correspond to a greater distance that the axle carrier moves 44 with respect to the swing member 30.

It will be appreciated that the location of the axle carrier 44 with respect to the swing member 30 can be selectively locked. In particular, during operation of the vehicle 10, the axle carrier 44 can be locked to ensure that the tension on the flexible drive member 24 is properly maintained. When a user chooses to adjust the tension on the flexible drive member 24 (e.g., to remove and/or install the flexible drive member 24), the axle carrier 44 can be unlocked and the position of the axle carrier 44 can be changed, such as with actuation of the elongate threaded member 54. In one embodiment, the first and second cylinders 40, 42 can be selectively locked (i.e., to lock the position of the axle carrier 44) by tightening nuts 88, 90 (shown in FIGS. 6 and 7). For example, to lock the axle carrier 44 with respect to the swing member 30, the nuts 88, 90 can be tightened to respectively urge the first and second plates 64, 74 against the first and second cylinders 40, 42 and the axle carrier. In addition, to unlock the axle carrier 44 with respect to the swing member 30, the nuts 88, 90 can be loosened to respectively release the first and second plates 64, 74 from the first and second cylinders 40, 42.

The foregoing description of embodiments and examples has been presented for purposes of illustration and description. It is not intended to be exhaustive or limiting to the forms described. Numerous modifications are possible in light of the above teachings. Some of those modifications have been discussed and others will be understood by those skilled in the art. The embodiments were chosen and described for illustration of various embodiments. The scope is, of course, not limited to the examples or embodiments set forth herein, but can be employed in any number of applications and equivalent devices by those of ordinary skill in the art. Rather it is hereby intended the scope be defined by the claims appended hereto.

What is claimed is:

1. An axle carrier assembly comprising:
    an axle carrier configured to rotatably support an axle;
    a first cylinder rotatably supported by the axle carrier such that the first cylinder is rotatable about a first axis, the first cylinder being configured to support a vehicular swing member at a location along the first cylinder that is offset from the first axis;
    a second cylinder rotatably supported by the axle carrier such that the second cylinder is rotatable about a second axis, the second cylinder being configured to support a vehicular swing member at a location along the second cylinder that is offset from the second axis; and
    an actuator associated with each of the first and second cylinders, the actuator being configured to substantially simultaneously rotate the first cylinder and the second cylinder with respect to the axle carrier;
    wherein the first cylinder comprises a first threaded outer surface, the second cylinder comprises a second threaded outer surface, and the actuator comprises an elongate threaded member that is rotatably supported by the axle carrier and engages each of the first threaded outer surface and the second threaded outer surface.

2. The axle carrier assembly of claim 1, further comprising:
    a first fastener configured to couple the first cylinder to a vehicular swing member; and
    a second fastener configured to couple the second cylinder to a vehicular swing member.

3. An axle carrier assembly comprising:
    an axle carrier configured to rotatably support an axle;
    a first cylinder rotatably supported by the axle carrier such that the first cylinder is rotatable about a first axis, the first cylinder being configured to support a vehicular swing member at a location along the first cylinder that is offset from the first axis;
    a second cylinder rotatably supported by the axle carrier such that the second cylinder is rotatable about a second axis, the second cylinder being configured to support a vehicular swing member at a location along the second cylinder that is offset from the second axis;
    an actuator associated with each of the first and second cylinders, the actuator being configured to substantially simultaneously rotate the first cylinder and the second cylinder with respect to the axle carrier;
    a first locking assembly configured to selectively secure the first cylinder with respect to the axle carrier; and
    a second locking assembly configured to selectively secure the second cylinder with respect to the axle carrier.

4. The axle carrier assembly of claim 3, further comprising:
    a first fastener configured to couple the first cylinder to a vehicular swing member; and
    a second fastener configured to couple the second cylinder to a vehicular swing member.

5. An axle carrier assembly comprising:
    an axle carrier defining an axle support aperture;
    a first cylinder rotatably supported by the axle carrier such that the first cylinder is rotatable about a first axis, the first cylinder comprising a first threaded outer surface and defining a first chamber, the first chamber having a first longitudinal centerline axis that is offset from the first axis;
    a second cylinder rotatably supported by the axle carrier such that the second cylinder is rotatable about a second axis, the second cylinder comprising a second threaded outer surface and defining a second chamber, the second chamber having a second longitudinal centerline axis that is offset from the second axis; and
    an elongate threaded member having a third threaded outer surface, the elongate threaded member contacting the first cylinder and the second cylinder such that the third threaded outer surface engages each of the first threaded outer surface and the second outer threaded surface;
    wherein actuation of the elongate threaded member substantially simultaneously rotates the first cylinder and the second cylinder with respect to the axle carrier.

6. The axle carrier assembly of claim 5 wherein the elongate threaded member is rotatably supported by the axle carrier.

7. The axle carrier assembly of claim 5 further comprising an axle journaled within the axle support aperture.

8. The axle carrier assembly of claim 5 further comprising:
    a first fastener extending into the first chamber; and
    a second fastener extending into the second chamber;
    wherein the first fastener and the second fastener facilitate respective releasable coupling of the first cylinder and the second cylinder to respective portions of a vehicular swing member.

9. The axle carrier assembly of claim 8 further comprising:
    a first locking member disposed adjacent to the first cylinder and the axle carrier;
    a second locking member disposed adjacent to the second cylinder and the axle carrier;
    wherein the first fastener releasably engages the first locking member with each of the first cylinder and the axle carrier to lock the first cylinder with respect to the axle carrier and wherein the second fastener releasably engages the second locking member with each of the second cylinder and the axle carrier to lock the second cylinder with respect to the axle carrier.

10. The axle carrier assembly of claim 9 wherein the first locking member comprises a plate defining a first opening and the first fastener extends through the first opening and into the first chamber and wherein the second locking member defines a second opening and the second fastener extends through the second opening and into the second chamber.

11. A vehicular drive assembly comprising:
    a swing member;
    an axle carrier;
    an axle rotatably supported by the axle carrier and comprising a drive member;
    a flexible drive member engaged with the drive member and configured to facilitate rotation of the axle;
    a first cylinder rotatably supported by the axle carrier such that the first cylinder rotates about a first axis, the first cylinder defining a first chamber, the first chamber having a first longitudinal centerline axis that is offset from the first axis;

a second cylinder rotatably supported by the axle carrier such that the second cylinder rotates about a second axis, the second cylinder defining a second chamber, the second chamber having a second longitudinal centerline axis that is offset from the second axis;

an actuator engaged with each of the first cylinder and the second cylinder, wherein actuation of the actuator substantially simultaneously rotates the first cylinder and the second cylinder with respect to the axle carrier;

a first fastener extending into the first chamber, wherein the first fastener couples the first cylinder to a portion of the swing member; and a second fastener extending into the second chamber wherein the second fastener couples the second cylinder to a portion of the swing member.

12. The vehicular drive assembly of claim 11 wherein the first cylinder comprises a first threaded outer surface, the second cylinder comprises a second threaded outer surface, and the actuator comprises an elongate threaded member in contact with each of the first threaded outer surface and the second threaded outer surface.

13. The vehicular drive assembly of claim 11 wherein the elongate threaded member is rotatably supported by the axle carrier.

14. The vehicular drive assembly of claim 13 further comprising:

a first locking member disposed between the first cylinder and the swing member;

a second locking member disposed between the second cylinder and the swing member;

wherein the first locking member selectively engages each of the first cylinder and the axle carrier to lock the first cylinder with respect to the axle carrier and the second locking member selectively engages each of the second cylinder and the axle carrier to lock the second cylinder with respect to the axle carrier.

15. The vehicular drive assembly of claim 14 wherein the first locking member comprises a first plate defining a first opening, the second locking member comprises a second plate defining a second opening, the first fastener extends through the first opening, and the second fastener extends through the second opening.

16. The vehicular drive assembly of claim 15 wherein the swing member comprises:

an upper swing member portion comprising a pair of upper ends;

and a lower swing member portion comprising a pair of lower ends;

wherein the first cylinder is disposed between the pair of upper ends, the first fastener extends through the first cylinder and is coupled to each of the upper ends, the second cylinder is disposed between the pair of lower ends, and the second fastener extends through the second cylinder and is coupled to each of the lower ends.

17. A vehicle comprising the vehicular drive assembly of claim 11.

* * * * *